US012604336B2

(12) United States Patent
Hart et al.

(10) Patent No.: US 12,604,336 B2
(45) Date of Patent: Apr. 14, 2026

(54) DELEGATED PEER-TO-PEER SCHEDULING ON ALLOCATED CHANNELS

(71) Applicant: Cisco Technology, Inc., San Jose, CA (US)

(72) Inventors: Brian D. Hart, Sunnyvale, CA (US); Malcolm M. Smith, Richardson, TX (US); Pooya Monajemi, San Jose, CA (US); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 444 days.

(21) Appl. No.: 18/193,501

(22) Filed: Mar. 30, 2023

(65) Prior Publication Data

US 2024/0155665 A1     May 9, 2024

Related U.S. Application Data

(60) Provisional application No. 63/382,954, filed on Nov. 9, 2022.

(51) Int. Cl.
| | |
|---|---|
| *H04W 72/563* | (2023.01) |
| *H04W 72/121* | (2023.01) |
| *H04W 72/51* | (2023.01) |

(52) U.S. Cl.
CPC ....... *H04W 72/563* (2023.01); *H04W 72/121* (2013.01); *H04W 72/51* (2023.01)

(58) Field of Classification Search
CPC .. H04W 72/563; H04W 72/51; H04W 72/121
See application file for complete search history.

(56) References Cited

U.S. PATENT DOCUMENTS

| | | | |
|---|---|---|---|
| 2012/0106475 A1 | 5/2012 | Jung | |
| 2013/0148642 A1 | 6/2013 | Abraham et al. | |
| 2013/0250898 A1 | 9/2013 | Rudolf et al. | |
| 2017/0164374 A1 | 6/2017 | Geirhofer et al. | |
| 2019/0155777 A1* | 5/2019 | Shim .................... | G06F 13/4068 |
| 2019/0236546 A1* | 8/2019 | Bikumala ............ | G06Q 10/101 |
| 2019/0311513 A1* | 10/2019 | Han ....................... | H04L 67/131 |
| 2020/0008210 A1* | 1/2020 | Li ....................... | H04W 72/1263 |
| 2020/0115931 A1* | 4/2020 | Elbieh .................... | E05B 85/06 |
| 2022/0129800 A1* | 4/2022 | March .................... | G06F 9/5077 |
| 2022/0150169 A1* | 5/2022 | Thai ....................... | H04L 63/123 |
| 2023/0134759 A1* | 5/2023 | March .................... | G06F 16/178 |
| | | | 707/703 |

(Continued)

*Primary Examiner* — Ajay Cattungal
(74) *Attorney, Agent, or Firm* — Patterson + Sheridan, LLP

(57) ABSTRACT

Techniques for delegated peer-to-peer scheduling are provided. A first peer-to-peer device determines one or more wireless channels allocated for peer-to-peer communication, and receives a request indicating a set of transmission characteristics from a second peer-to-peer device that uses the first peer-to-peer device as a communications proxy. The first peer-to-peer device schedules wireless resources of the one or more wireless channels to a plurality of peer-to-peer devices based at least in part on the set of transmission characteristics, and performs peer-to-peer communications with the second peer-to-peer device in accordance with the scheduled wireless resources.

18 Claims, 6 Drawing Sheets

(56)        References Cited

U.S. PATENT DOCUMENTS

2023/0180047 A1 *   6/2023   Ajami ............... H04W 52/0216
                                                                370/230
2024/0007540 A1 *   1/2024   Knorovich .......... H04L 67/1097
2025/0056614 A1 *   2/2025   Quan ....................... H04W 8/22

* cited by examiner

100

110

105

Peer-to-Peer
Coordinator

115A

115B

115C

115D

115E

115F

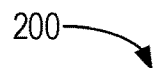
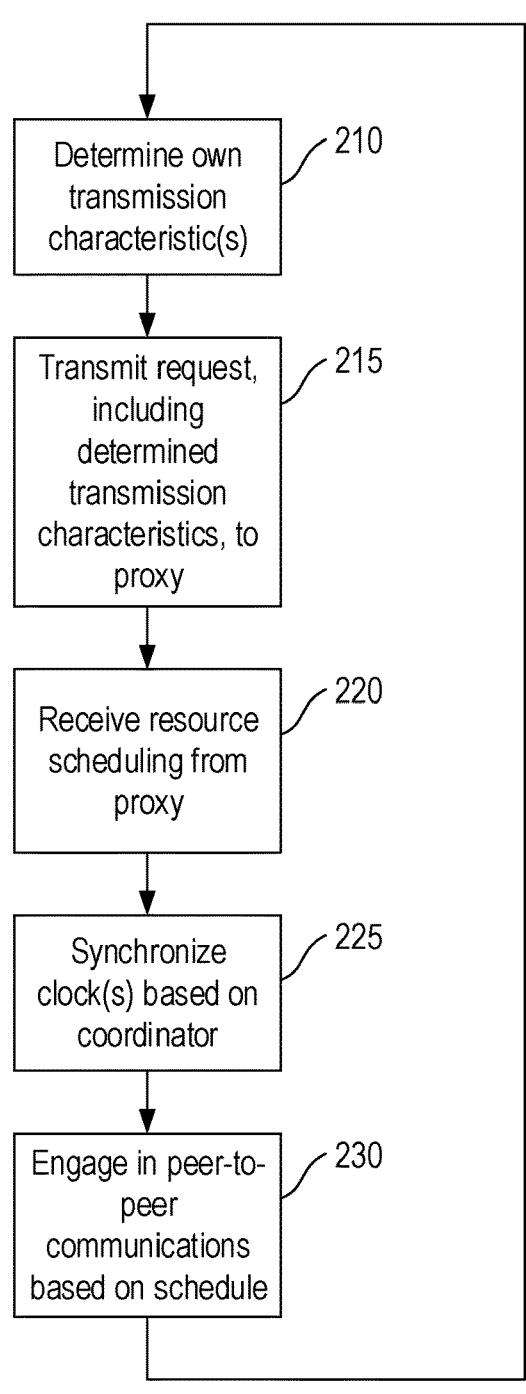
Determine own transmission characteristic(s) — 210
Transmit request, including determined transmission characteristics, to proxy — 215
Receive resource scheduling from proxy — 220
Synchronize clock(s) based on coordinator — 225
Engage in peer-to-peer communications based on schedule — 230
*FIG. 2*

300

400

405 Determine allocated spectrum

410 Receive request(s) including transmission characteristic(s)

415 Determine own transmission characteristic(s)

420 Determine transmission priorities

425 Schedule time slots based on priorities and characteristics

430 Distribute scheduling

435 Engage in peer-to-peer communications based on schedule

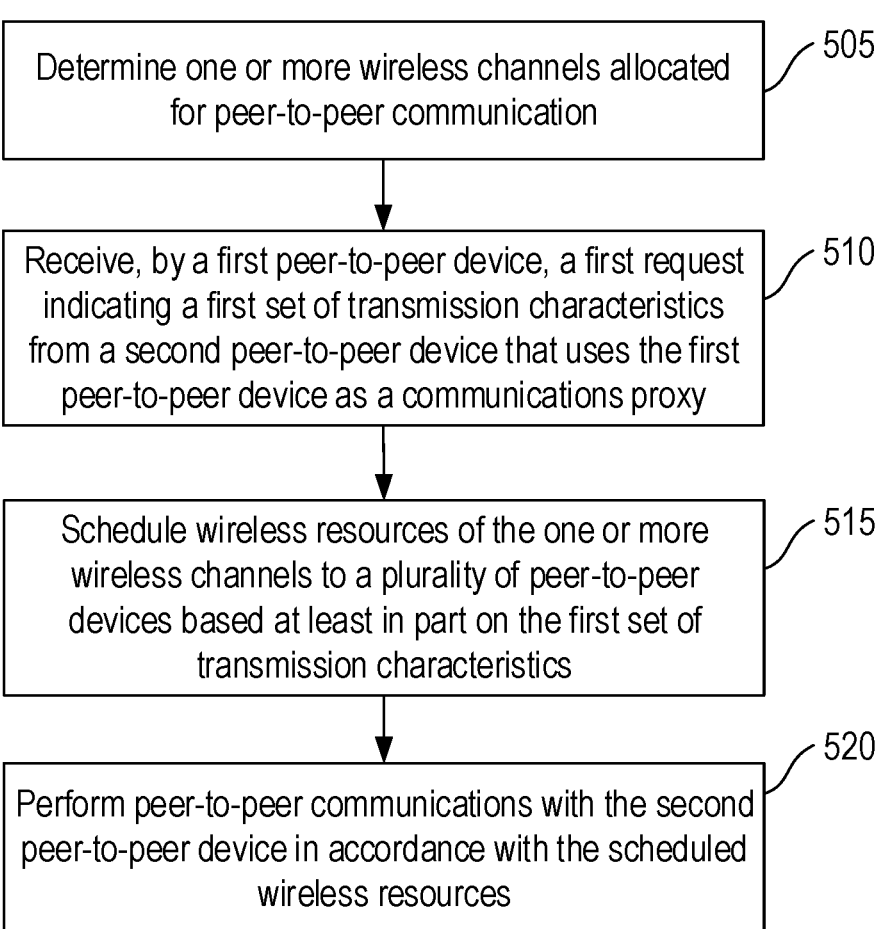

500

| |
|---|
| Determine one or more wireless channels allocated for peer-to-peer communication |

505

| |
|---|
| Receive, by a first peer-to-peer device, a first request indicating a first set of transmission characteristics from a second peer-to-peer device that uses the first peer-to-peer device as a communications proxy |

510

| |
|---|
| Schedule wireless resources of the one or more wireless channels to a plurality of peer-to-peer devices based at least in part on the first set of transmission characteristics |

515

| |
|---|
| Perform peer-to-peer communications with the second peer-to-peer device in accordance with the scheduled wireless resources |

DELEGATED PEER-TO-PEER SCHEDULING ON ALLOCATED CHANNELS

CROSS-REFERENCE TO RELATED APPLICATIONS

This application claims benefit of U.S. provisional patent application Ser. No. 63/382,954 filed Nov. 9, 2022. The aforementioned related patent application is herein incorporated by reference in its entirety.

TECHNICAL FIELD

Embodiments presented in this disclosure generally relate to peer-to-peer communications. More specifically, embodiments disclosed herein relate to delegated scheduling of peer-to-peer communications.

BACKGROUND

In some wireless local area network (WLAN) deployments, such as WiFi systems, peer-to-peer (P2P) or client-to-client (C2C) mechanisms can be used to enable direct communication between devices. This can more generally be viewed as a network allowing one or more other devices to directly communicate with each other without requiring uplink/downlink from the network (e.g., without transmitting data to or receiving data from a wireless access point (AP) that provides the WLAN connectivity). In some systems, peer-to-peer support is limited to APs allocating time slots (e.g., TXOPs) and/or resource units (RUs) for peer-to-peer stations (STAs), such as within a multiuser (MU) trigger-based physical layer protocol data unit (TB-PPDU).

Conventional approaches to peer-to-peer scheduling are generally inefficient and do not scale well, particularly when a large number of peer-to-peer devices are present and/or a large amount of peer-to-peer communication occurs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 2 is a flow diagram depicting an example method for performing peer-to-peer communication using delegated scheduling, according to some embodiments of the present disclosure.

FIG. 5 is a flow diagram depicting an example method for peer-to-peer communication scheduling, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
FIG. 1 depicts an example environment for delegation of peer-to-peer scheduling, according to some embodiments of the present disclosure.

One embodiment presented in this disclosure provides a method, including: determining, by a first peer-to-peer device, one or more wireless channels allocated for peer-to-peer communication; receiving, by the first peer-to-peer device, a first request indicating a first set of transmission characteristics from a second peer-to-peer device that uses the first peer-to-peer device as a communications proxy; scheduling, by the first peer-to-peer device, wireless resources of the one or more wireless channels to a plurality of peer-to-peer devices based at least in part on the first set of transmission characteristics; and performing, by the first peer-to-peer device, peer-to-peer communications with the second peer-to-peer device in accordance with the scheduled wireless resources.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

EXAMPLE EMBODIMENTS

Embodiments of the present disclosure provide methods, systems, and techniques for improved peer-to-peer communications via scheduling delegation.

In some embodiments, rather than requiring infrastructure devices (e.g., APs) to perform active scheduling of peer-to-peer communications, this scheduling authority can be delegated to one or more other systems (e.g., to the peer-to-peer devices themselves). For example, in some embodiments, a portion of a radio frequency (RF) spectrum may be allocated or reserved for peer-to-peer communication (e.g., by one or more APs, or by prior industry agreement or regulation). In an embodiment, a peer-to-peer coordinator performs the communication scheduling, as discussed in more detail below.

In some embodiments, some peer-to-peer devices may act as companions or proxies for other peer-to-peer devices (referred to in some aspects as subtended devices). For example, the proxy device may be connected to a WLAN system and act as a soft AP for the subtended device(s), which may or may not have their own connection to the WLAN. In some such embodiments, devices acting as companion/proxies (e.g., soft APs) to other peer-to-peer devices may be reluctant to relinquish control of the peer-to-peer link mechanism. That is, though conventional approaches involve the AP scheduling such peer-to-peer communications, some peer-to-peer devices may prefer to retain such control. For example, because the infrastructure does not necessarily manage the actual peer-to-peer device itself (particularly if the device does not actually authenticate directly with the AP), as well as the fact that the spectrum is generally for unlicensed use (e.g., in the WiFi spectrum), some peer-to-peer devices may be reluctant to allow the AP to control or schedule their use of the spectrum.

Given the limitations of conventional systems with respect to peer-to-peer communications, as well as the reluctance of some peer-to-peer devices to be scheduled by the AP(s) or WLAN components, some embodiments of the present disclosure provide alternate means of scheduling peer-to-peer communications while avoiding transmission interference to the WLAN.

In some embodiments, the peer-to-peer devices can perform distributed scheduling among themselves on allocated peer-to-peer channel(s) (e.g., portions of the RF spectrum). As discussed below in more detail, these peer-to-peer communications can include embodiments where a proxy/companion peer-to-peer device acts as a soft-AP and manages the peer-to-peer links with its subordinate or subtended peer-to-peer device(s), as well as embodiments where one or more peer-to-peer devices act independently.

In some embodiments, when one or more devices act as proxies for other devices, a hierarchy of peer-to-peer devices can be established between peers on the same peer-to-peer channel, and the proxy device(s) may be used to collect and/or provide the traffic needs of its subtended device(s) to facilitate communication scheduling, as discussed below in more detail. For example, each subtended peer-to-peer device may report its transmission traffic characteristics/needs to its proxy, and these characteristics can then extrapolated into the transmission timeslots, as discussed in more detail below. Generally, the traffic characteristics can be reported through a variety of metrics, such as beacons or target beacon transmission time (TBTT), restricted target wake time (rTWT), quality of service (QoS) characteristics, and/or stream classification service (SCS) techniques.

In an embodiment, these traffic characteristics can then be forwarded to the scheduling peer-to-peer device (e.g., the peer-to-peer coordinator). In some embodiments, the proxy devices can also provide their own transmission characteristics to the peer-to-peer coordinator, which then provides the scheduling assignments. In some embodiments, the coordinator can schedule time slots for peer-to-peer communications with respect to each peer-to-peer device, and/or for each subnet (e.g., each group of a proxy and its subtended device(s)). That is, the coordinator may schedule transmissions specifically for the subtended devices, or may schedule them for the group of devices, allowing the proxy device to allocate or share the scheduled resources among its subtended device(s).

Generally, the peer-to-peer coordinator can be implemented by a variety of devices and systems, depending on the particular implementation. For example, in some embodiments, one of the peer-to-peer devices can serve as the peer-to-peer coordinator. In some embodiments, other systems may be used (e.g., dedicated coordinators). In at least one embodiment, an AP may be used as the peer-to-peer coordinator. In such an embodiment, however, the AP may simply be used as extra compute to generate the schedules (which are provided to the peer-to-peer device(s)), but may not actively control or implement the schedules themselves.

In embodiments, based on the reported traffic characteristics of the peer-to-peer devices, the peer-to-peer coordinator can schedule non-overlapping slots based on priority. In some embodiments, the priorities can be defined in a variety of ways based on the flows and/or device characteristics. For example, SCS QoS characteristics of each flow may be used, such as the traffic identifier (TID) of the flow, the flow start time, the flow period, the MAC address (including randomizers, in the case of competing flows), and the like. In such embodiments, the peer-to-peer coordinator can continually update the schedule as subtended peer-to-peer devices and/or proxy peer-to-peer devices move (e.g., enter or leave the peer-to-peer communications/group).

In some embodiments, the scheduled timeslots are expressed in an unambiguous way temporally. While conventional approaches may solve this concern by using the AP as the source of time, this AP time may not be available in delegated scheduling embodiments. In some embodiments, therefore, the peer-to-peer coordinator can be defined as the source of time such that the time of all events (e.g., scheduled timeslots) can be defined relative to the peer-to-peer coordinator's timing synchronization function (TSF). In some embodiments, if the APs in the coordinated infrastructure that support the peer-to-peer group are already synchronized, however, the selection of time source may become moot (as this coordinated time may be used as the source time).

FIG. 1 depicts an example environment 100 for delegation of peer-to-peer scheduling, according to some embodiments of the present disclosure.

In the illustrated example, a wireless AP 110 is communicatively coupled with a peer-to-peer coordinator 105. The wireless AP 110 is generally representative of an infrastructure network, such as a WLAN. Though a single AP 110 is depicted for conceptual clarity, in embodiments, there may be any number of APs 110. Generally, the AP(s) 110 are used to provide wireless communication via the WLAN. For example, each AP 110 may receive traffic requests from associated devices (e.g., indicating the amount of data to be transmitted, the priority of the flow, and the like). The AP 110 may then allocate available network resources to associated devices, such as by scheduling transmissions into defined timeslots and/or portions of the spectrum. For example, within each transmission opportunity (TXOP), the AP 110 may assign RU(s) to one or more connected devices, where each connected device uses the scheduled resources to transmit data to the AP 110 (or to receive data from the AP 110).

Generally, the scheduled transmissions managed by the AP 110 can include uplink transmissions (e.g., data transmitted from one or more connected devices to the AP 110) and downlink transmissions (e.g., data transmitted from the AP 110 to one or more connected devices). In the illustrated example, the AP 110 may delegate the scheduling/management of peer-to-peer transmissions (which are transmitted and received directly between peer-to-peer devices 115) to the peer-to-peer coordinator 105. Although depicted as a discrete system for conceptual clarity, in some aspects, the peer-to-peer coordinator 105 may be implemented as part of the AP 110, or as part of one of the peer-to-peer devices 115.

In the illustrated example, a variety of peer-to-peer devices 115 are present. Some of these devices (e.g., peer-to-peer devices 115A, 115B, and 115C) are communicatively coupled with the peer-to-peer coordinator 105. Some (e.g., peer-to-peer devices 115D, 115E, and 115F) do not have this direct connection. For example, as illustrated, the peer-to-peer device 115B may act as a proxy, companion, or soft AP for the peer-to-peer devices 115D and 115E. Similarly, the peer-to-peer device 115C acts as a proxy or soft AP for the peer-to-peer device 115F. In some aspects, the peer-to-peer devices 115D, 115E, and 115F may be referred to as "subtended" devices, as discussed above.

In some embodiments, the subtended peer-to-peer devices 115D, 115E, and 115F may rely on their proxies to provide transmission scheduling, connectivity, and the like. Although not included in the illustrated example, in some embodiments, the subtended devices may include communication links to one or more other peer-to-peer devices. For example, the peer-to-peer device 115D may be able to communicate directly with the peer-to-peer device 115E. In other embodiments, the subtended devices may use their proxies for all communications. For example, the peer-to-peer device 115D may transmit data to the peer-to-peer device 115E via the peer-to-peer device 115B (e.g., where the peer-to-peer device 115B acts as a soft AP).

In the illustrated example, the peer-to-peer devices 115 higher in the hierarchy (e.g., peer-to-peer devices 115A, 115B, and 115C) may communicate directly with each other. Though not included in the illustrated example, in some embodiments, some or all of the peer-to-peer devices 115A-F may additionally include one or more links to the AP 110. That is, one or more of the depicted devices may be associated directly to the WLAN, in addition to supporting peer-to-peer communications.

In the illustrated environment 100, the peer-to-peer coordinator 105 may determine or identify one or more portion(s) of the RF spectrum that are allocated for peer-to-peer use. That is, portion(s) of the spectrum (e.g., one or more channels) may be allocated or reserved for peer-to-peer use (e.g., for peer-to-peer communications among peer-to-peer devices 115), as opposed to conventional WLAN use (e.g., for communications to and/or from the AP 110). This allocation may be static or predefined (e.g., determined based on industry agreement such that the peer-to-peer channel(s) are relatively fixed), or may be dynamic (e.g., selected by the AP 110 itself, or after negotiation between the AP 110 and the peer-to-peer coordinator 105).

In the illustrated example, the subtended devices (e.g., peer-to-peer devices 115D, 115E, and 115F) can provide, to their respective proxies, requests for transmission time. For example, the peer-to-peer devices 115D-F may indicate their respective transmission characteristics, such as the amount of data they will transmit, the periodicity of the data, the priority of the data, and the like. Generally, the peer-to-peer devices 115D-F may indicate their traffic needs to their respective proxies using any suitable techniques, including using various out of band (OOB) techniques (e.g., Bluetooth or other short-range wireless communications).

In the illustrated example, the proxy peer-to-peer devices 115B and 115C can forward these indicated traffic needs to the peer-to-peer coordinator 105. Similarly, each of the peer-to-peer devices 115A-C can additionally transmit their own requests for transmissions to the peer-to-peer coordinator 105. For example, each peer-to-peer device 115A-C may indicate, to the peer-to-peer coordinator 105, their respective transmission traffic characteristics (e.g., amount of data, periodicity of the data, priority of the data, and the like). As discussed above, this signaling of traffic needs may be performed using a variety of techniques and resources, including by using the allocated peer-to-peer channel(s), using OOB techniques, and the like. In some embodiments, the peer-to-peer devices 115 acting as proxies (e.g., 115B and 115C) may transmit independent requests for each subtended device and for itself, or may aggregate the traffic characteristics into a single request.

As illustrated, the peer-to-peer coordinator 105 can use the indicated traffic needs to schedule the peer-to-peer transmissions into timeslots based on priority, as discussed above. For example, the peer-to-peer may assign or allocate the flows into non-overlapping timeslots and/or non-overlapping portions of the allocated peer-to-peer spectrum based on the associated priorities.

In some embodiments, the peer-to-peer coordinator 105 can schedule the transmissions by assigning each portion of the allocated spectrum or channel(s) (e.g., one or more subcarriers, such as an RU) during a defined window of time (e.g., a TXOP) to devices. That is, for each TXOP, the peer-to-peer coordinator 105 may assign the available RU(s) to one or more peer-to-peer devices 115, allowing each peer-to-peer device 115 to use the assigned wireless resources, during the TXOP, to transmit data to another peer-to-peer device 115.

In some embodiments, as discussed above, the peer-to-peer coordinator 105 can schedule transmission time specifically for the subtended peer-to-peer devices 115D-F. In other embodiments, the peer-to-peer coordinator 105 may schedule transmissions for the proxy peer-to-peer devices 115B-C and/or for the group of peer-to-peer devices, allowing the proxy devices to allocate, schedule, or distribute the resources among the subtended devices.

In this way, the peer-to-peer coordinator 105 can manage the peer-to-peer communications independently from the WLAN (e.g., independently from the AP 110 managing communications on the WLAN). This can improve the efficiency of the scheduling and peer-to-peer communications, as well as reducing computational burden on the WLAN components (e.g., the AP 110), reducing the potential for interference to WLAN-connected devices, and generally improving the operations of the WLAN and the peer-to-peer devices 115.

FIG. 2 is a flow diagram depicting an example method 200 for performing peer-to-peer communication using delegated scheduling, according to some embodiments of the present disclosure. In some embodiments, the method 200 is performed by a peer-to-peer device, such as a peer-to-peer device 115 of FIG. 1. In some embodiments, the method 200 is performed by a subtended peer-to-peer device that uses another peer-to-peer device as a proxy. For example, the method 200 may be performed by the peer-to-peer device 115D, 115E, and/or 115F of FIG. 1.

At block 210, the peer-to-peer device determines its own transmission characteristics. As discussed above, the transmission characteristics can generally indicate the traffic needs of the device, such as the amount of data the device wishes to transmit, the periodicity of the data (e.g., how often the device wishes to transmit the amount of data), the urgency or priority of the data transmissions, and the like.

At block 215, the peer-to-peer device transmits a request for peer-to-peer transmissions, including the determined traffic characteristics, to its proxy peer-to-peer device (e.g., to the peer-to-peer device 115A, 115B, and/or 115C of FIG. 1). As discussed above, the traffic characteristics or needs can generally be provided using a variety of metrics and techniques, including SCS, QoS characteristics, and the like. In some embodiments, as discussed above, the peer-to-peer device can provide its transmission or traffic characteristics using one or more OOB techniques, rather than using the allocated peer-to-peer channel(s). For example, the peer-to-peer device may use Bluetooth or other short-range radio techniques to request the transmission time.

At block 220, the peer-to-peer device receives, from its proxy peer-to-peer device, resource scheduling. That is, the peer-to-peer device receives an indication of the resource(s) (e.g., time slots and/or subcarriers) assigned to the peer-to-peer device for performing the requested peer-to-peer transmission. For example, in some embodiments, the peer-topeer coordinator transmits a trigger frame indicating the scheduled transmissions, which the proxy device can forward or provide to the peer-to-peer device.

In some embodiments, depending on the particular implementation, the peer-to-peer device may or may not receive a scheduled time slot immediately (e.g., for the next transmission opportunity). For example, if there are a large number of peer-to-peer devices and/or other devices have higher priority flows, the peer-to-peer device performing the method 200 may have to wait a period of time after requesting a transmission opportunity before one is actually assigned.

At block 225, the peer-to-peer device can synchronize its clock(s) or time based on the clock(s) or time of the peer-to-peer coordinator. For example, as discussed above, the peer-to-peer coordinator may be defined as the source of time, such that the time slots are scheduled relative to the coordinator's timer. In some embodiments, as discussed above, the peer-to-peer device may alternatively use another source of time, such as the AP(s) clock (if available). In some embodiments, time synchronization can be based on a recent event, such as the start or end of a transmission by the proxy peer-to-peer device (if any) or the peer-to-peer coordinator 105.

At block 230, the peer-to-peer device can then engage in peer-to-peer communications based on the schedule (e.g., using the assigned/scheduled wireless resources during the assigned time slot(s)). For example, the peer-to-peer device may use the scheduled time slot to transmit data to another peer-to-peer device (e.g., to its proxy device).

The method 200 then returns to block 210. In this way, the method 200 repeats (potentially indefinitely), allowing the peer-to-peer device to request peer-to-peer communication resources whenever they are needed, by the peer-to-peer device, to transmit data to another peer. As discussed above, this dynamic scheduling (where different resources and time slots can be allocated to each peer-to-peer device at different times) can improve communication efficiency and reduce or prevent interference and contention in the peer-to-peer network, as well as with the broader WLAN (if present). Though not depicted in the illustrated example, in some embodiments there may be delays or wait states between various blocks of the method 200 (such as after block 230 and/or before block 210). Similarly, in some embodiments, some of the blocks may operate or be executed entirely or substantially in parallel (e.g., block 225 may operate in parallel of one or more other blocks).

Figure 3:
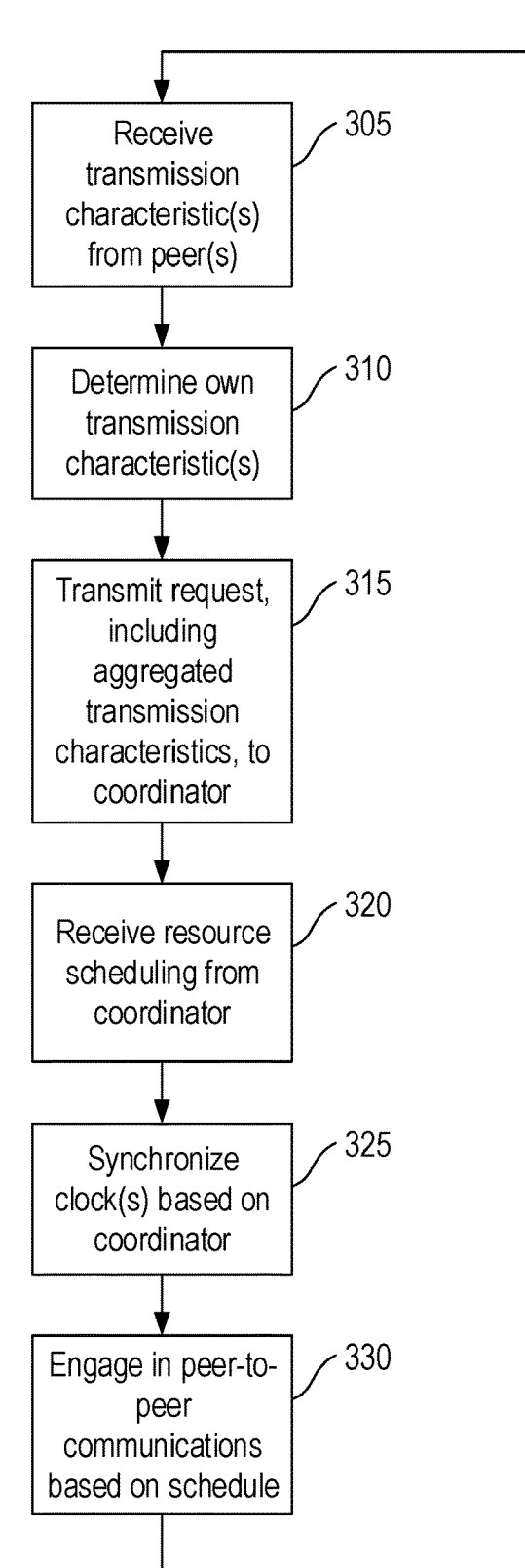
FIG. 3 is a flow diagram depicting an example method for performing peer-to-peer communication using delegated scheduling, according to some embodiments of the present disclosure.

FIG. 3 is a flow diagram depicting an example method 300 for performing peer-to-peer communication using delegated scheduling, according to some embodiments of the present disclosure. In some embodiments, the method 300 is performed by a peer-to-peer device, such as a peer-to-peer device 115 of FIG. 1. In some embodiments, the method 300 is performed by a peer-to-peer device that acts as a proxy for one or more other peer-to-peer devices. For example, the method 300 may be performed by the peer-to-peer device 115A, 115B, and/or 115C of FIG. 1.

At block 305, the peer-to-peer device receives, from one or more subtended peer-to-peer devices for which the peer-to-peer device acts as a proxy (e.g., from the peer-to-peer device 115D, 115E, and/or 115F of FIG. 1), one or more transmission requests (e.g., transmission characteristics or traffic needs). As discussed above, the transmission characteristics can generally indicate the traffic needs of the subtended device(s), such as the amount of data the device(s) wish to transmit, the periodicity of the data (e.g., how often the device(s) wish to transmit the amount of data), the urgency or priority of the data transmissions, and the like.

As discussed above, the traffic characteristics or needs can generally be provided using a variety of metrics and techniques, including SCS, QoS characteristics, and the like. In some embodiments, as discussed above, the peer-to-peer device can receive the transmission or traffic characteristics from the subtended device(s) using one or more OOB techniques, rather than using the allocated peer-to-peer channel(s). For example, the peer-to-peer devices may use Bluetooth or other short-range radio techniques to provide the transmission request.

At block 310, the peer-to-peer device also determines its own transmission characteristics. That is, in addition to determining the characteristics indicated by the subtended peer(s), the peer-to-peer device can also determine its own needs and traffic characteristics.

At block 315, the peer-to-peer device transmits an aggregated request for peer-to-peer transmissions, including the received traffic characteristics from the subtended peer-to-peer device(s) as well as the traffic characteristics of the peer-to-peer device itself, to the peer-to-peer coordinator. As discussed above, these traffic characteristics or needs can generally be provided using a variety of metrics and techniques. In some embodiments, the aggregation may be performed so as to avoid double counting. For example, if the peer-to-peer device transmits to a peer, and the peer has already transmitted a request (to the coordinator) for traffic to and from the peer-to-peer device, then this peer-to-peer device should not further add a request for that traffic in the aggregated request.

At block 320, the peer-to-peer device receives, from the peer-to-peer coordinator, resource scheduling. That is, the peer-to-peer device receives an indication of the resource(s) (e.g., time slots and/or subcarriers) assigned to the peer-to-peer device (or its subtended peers) for performing the requested peer-to-peer transmission(s). For example, in some embodiments, the peer-to-peer coordinator transmits a trigger frame indicating the scheduled transmissions, which the peer-to-peer device can forward or provide to its subtended peer(s). That is, the peer-to-peer device may directly forward the scheduling, or may otherwise allocate or distribute the scheduled time among its subtended device(s).

In some embodiments, depending on the particular implementation, the peer-to-peer device may or may not receive a scheduled time slot immediately (e.g., for the next transmission opportunity). For example, if there are a large number of peer-to-peer devices and/or other devices have higher priority flows, the peer-to-peer device performing the method 300 may have to wait a period of time after requesting a transmission opportunity before one is actually assigned.

At block 325, the peer-to-peer device can synchronize its clock(s) or time based on the clock(s) or time of the peer-to-peer coordinator. For example, as discussed above, the peer-to-peer coordinator may be defined as the source of time, such that the time slots are scheduled relative to the coordinator's timer. In some embodiments, as discussed above, the peer-to-peer device may alternatively use another source of time, such as the AP(s) clock (if available). In some embodiments, as discussed above, synchronization may be based on other criteria, such as a recent event (e.g., the start or end of a transmission by the proxy or the peer-to-peer coordinator).

At block 330, the peer-to-peer device can then engage in peer-to-peer communications based on the schedule (e.g., using the assigned resources during the assigned time slot(s)). For example, the peer-to-peer device may use the scheduled time slot to transmit data to another peer-to-peer device (e.g., to its subtended device(s), or to other peer-to-peer devices).

The method 300 then returns to block 305. In this way, the method 300 repeats (potentially indefinitely), allowing the peer-to-peer device to request peer-to-peer communication resources whenever they are needed, by the peer-to-peer device or its subtended device(s), to transmit data to another peer. As discussed above, this dynamic scheduling (where different resources and time slots can be allocated to each peer-to-peer device at different times) can improve communication efficiency and reduce or prevent interference and contention in the peer-to-peer network, as well as with the broader WLAN (if present). Although not depicted in the illustrated example, in some embodiments there may be delay or wait states between one or more blocks (such as after block 330 and/or before block 305). Similarly, in some embodiments, some of the depicted blocks might operate entirely or substantially in parallel (e.g., block 325 might operate in parallel with one or more other blocks).

Figure 4:
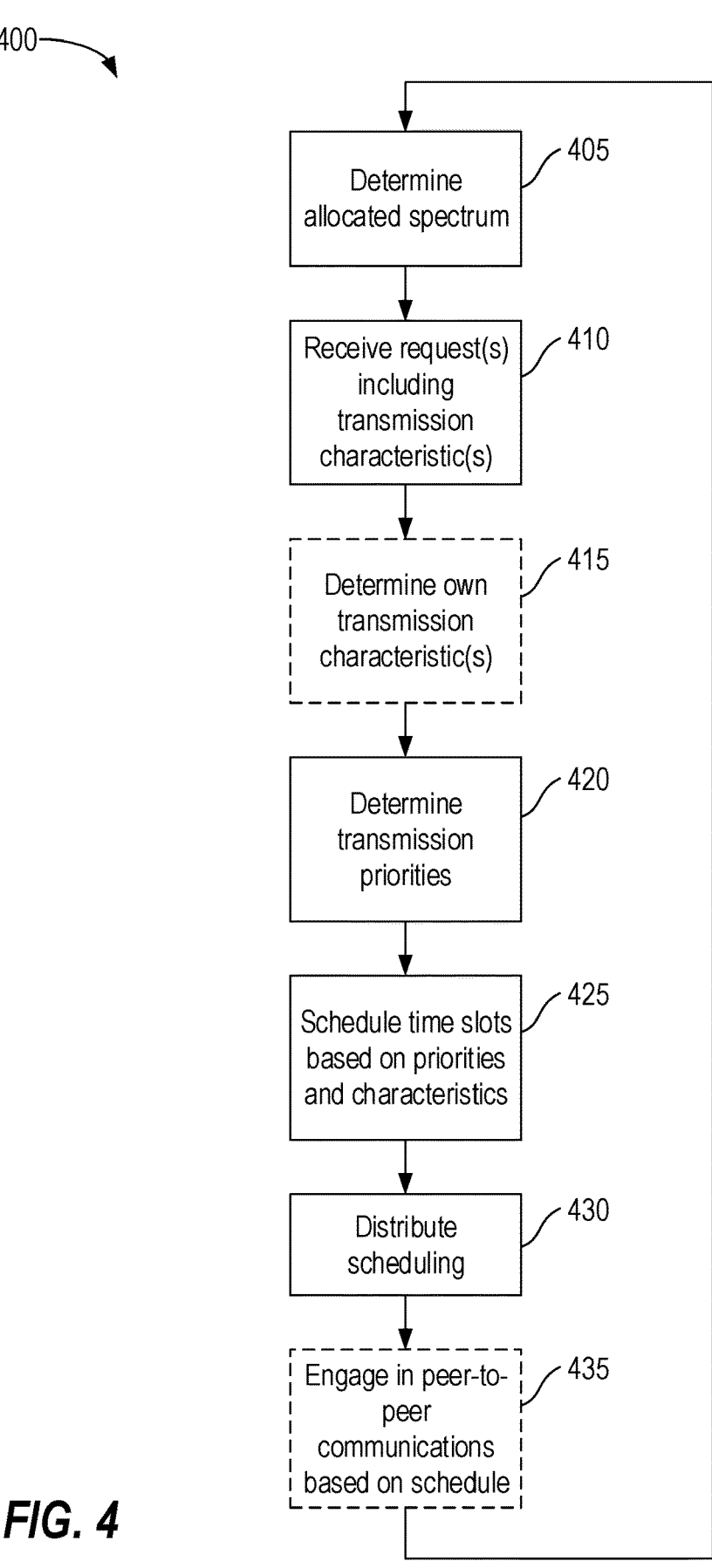
FIG. 4 is a flow diagram depicting an example method for delegated scheduling of peer-to-peer communication, according to some embodiments of the present disclosure.

FIG. 4 is a flow diagram depicting an example method 400 for delegated scheduling of peer-to-peer communication, according to some embodiments of the present disclosure. In some embodiments, the method 400 is performed by a peer-to-peer coordinator, such as a peer-to-peer coordinator 105 of FIG. 1.

At block 405, the peer-to-peer coordinator determines the portion(s) of the RF spectrum that have been allocated for peer-to-peer communications. In some embodiments, as discussed above, the peer-to-peer spectrum is allocated by one or more infrastructure components (e.g., WLAN AP(s), WLAN controller(s), and the like). For example, if a WLAN is present, the WLAN controller and/or one or more APs may allocate one or more channels in one or more frequency bands to be used for peer-to-peer communications. In some embodiments, the peer-to-peer spectrum is allocated by prior agreement, such as among industry entities (e.g., manufacturers of WLAN equipment, standards-setting groups, and the like). Generally, the allocated peer-to-peer channels can be used for peer-to-peer communications (as scheduled by a coordinator), and are not used by the AP(s) in the WLAN (if present).

At block 410, the peer-to-peer coordinator receives, from one or more peer-to-peer devices (e.g., from the peer-to-peer device 115A, 1158, and/or 115C of FIG. 1), one or more transmission requests (e.g., transmission characteristics or traffic needs). As discussed above, the transmission characteristics can generally indicate the traffic needs of the peer-to-peer device(s) and/or the traffic needs of any subtended devices that use the peer-to-peer device(s) as proxies, such as the amount of data the device(s) wish to transmit, the periodicity of the data (e.g., how often the device(s) wish to transmit the amount of data), the urgency or priority of the data transmissions, and the like.

As discussed above, the traffic characteristics or needs can generally be provided using a variety of metrics and techniques, including SCS, QoS characteristics, and the like. In some embodiments, as discussed above, the peer-to-peer coordinator can receive the transmission or traffic characteristics from the peer-to-peer device(s) via the allocated peer-to-peer spectrum. In other embodiments, the peer-to-peer coordinator may receive the characteristics via one or more OOB techniques, rather than using the allocated peer-to-peer channel(s).

At block 415, the peer-to-peer coordinator can optionally determine its own transmission characteristics. That is, if the peer-to-peer coordinator is itself a peer-to-peer device that engages in peer-to-peer communication, the peer-to-peer coordinator can determine its own transmission characteristics to potentially allocate one or more time slots to itself.

At block 420, the peer-to-peer coordinator determines transmission priorities for any requested transmissions (reflected in the request(s) received from peer-to-peer devices, as well as the peer-to-peer coordinator's own transmission needs, if relevant). For example, as discussed above, the transmission priorities may be determined based on QoS characteristics or parameters (e.g., based on the content of the flows), based on the identity of each peer-to-peer device, and the like.

At block 425, based on the determined priorities and traffic characteristics, the peer-to-peer coordinator schedules transmission time slots for the requested transmission. For example, as discussed above, the peer-to-peer coordinator can schedule the transmissions by assigning each portion of the allocated spectrum or channel(s) (e.g., one or more subcarriers, such as an RU) during a defined window of time (e.g., a TXOP) to peer-to-peer devices. That is, for each TXOP, the peer-to-peer coordinator may assign the available RU(s) to one or more peer-to-peer devices, allowing each peer-to-peer device to use the assigned resources, during the TXOP, to transmit data to another peer-to-peer device.

At block 430, the peer-to-peer coordinator distributes the generated scheduling. For example, as discussed above, the peer-to-peer coordinator may transmit one or more trigger frames to the peer-to-peer devices (e.g., using a broadcast frame on the allocated peer-to-peer spectrum) indicating the resource assignments for the next transmission opportunity.

At block 435, the peer-to-peer coordinator can then optionally engage in peer-to-peer communications based on the schedule (e.g., using the assigned resources during the assigned time slot(s)). For example, if the peer-to-peer coordinator is itself a peer-to-peer device that uses the peer-to-peer spectrum, the peer-to-peer coordinator may use the resource(s) assigned to itself during the time slot to transmit data to one or more other peer-to-peer devices. In some embodiments, the peer-to-peer coordinator initiates or triggers the scheduled transmissions based on its own clock (if the peer-to-peer coordinator acts as the source time), such as by sending another trigger frame to mark the start of the transmission opportunity.

The method 400 then returns to block 405. In this way, the method 400 repeats (potentially indefinitely), allowing the peer-to-peer coordinator to schedule communication resources whenever they are needed to transmit data among peer-to-peer devices. As discussed above, this dynamic scheduling (where different resources and time slots can be allocated to each peer-to-peer device at different times) can improve communication efficiency and reduce or prevent interference and contention in the peer-to-peer network, as well as with the broader WLAN (if present).

FIG. 5 is a flow diagram depicting an example method 500 for peer-to-peer communication scheduling, according to some embodiments of the present disclosure. In some embodiments, the method 500 is performed by a peer-to-peer device, such as a peer-to-peer device 115 of FIG. 1. In some embodiments, the method 500 is performed by a peer-to-peer device acting as a peer-to-peer coordinator, such as the peer-to-peer coordinator 105 of FIG. 1.

At block 505, one or more wireless channels allocated for peer-to-peer communication are determined.

At block 510, a first peer-to-peer device (e.g., peer-to-peer device 115B of FIG. 1, and/or peer-to-peer coordinator 105 of FIG. 1) receives a first request indicating a first set of transmission characteristics from a second peer-to-peer device (e.g., peer-to-peer device 115D of FIG. 1) that uses the first peer-to-peer device as a communications proxy.

At block 515, wireless resources of the one or more wireless channels are scheduled to a plurality of peer-to-peer devices based at least in part on the first set of transmission characteristics.

At block 520, peer-to-peer communications are performed with the second peer-to-peer device in accordance with the scheduled wireless resources.

Figure 6:
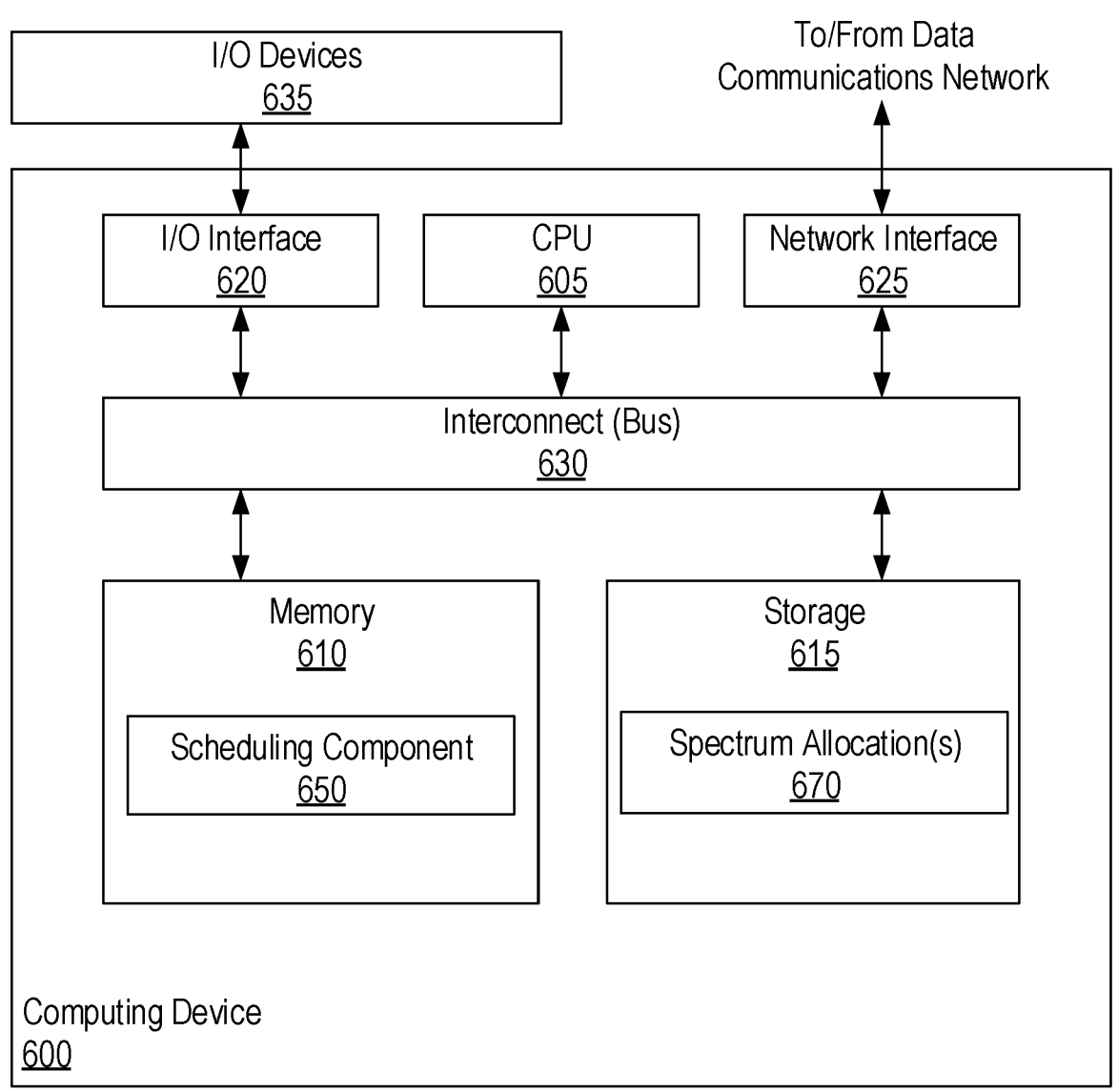
FIG. 6 depicts an example computing device configured to perform various aspects of the present disclosure, according to some embodiments of the present disclosure.

FIG. 6 depicts an example computing device 600 configured to perform various aspects of the present disclosure, according to some embodiments of the present disclosure. Although depicted as a physical device, in embodiments, the computing device 600 may be implemented using virtual device(s), and/or across a number of devices (e.g., in a cloud environment). In one embodiment, the computing device 600 corresponds to a peer-to-peer device, such as a peer-to-peer device 115 of FIG. 1, and/or to a peer-to-peer device acting as a peer-to-peer coordinator, such as the peer-to-peer coordinator 105 of FIG. 1.

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a scheduling component 650, which may perform one or more embodiments discussed above. Although depicted as a discrete component for conceptual clarity, in embodiments, the operations of the depicted component (and others not illustrated) may be combined or distributed across any number of components. Further, although depicted as software residing in memory 610, in embodiments, the operations of the depicted component (and others not illustrated) may be implemented using hardware, software, or a combination of hardware and software.

In one embodiment, the scheduling component 650 may be used to schedule peer-to-peer communications, as discussed above. For example, the peer-to-peer may receive and evaluate traffic or transmission characteristics to determine the relative priorities, traffic needs, and the like. The peer-to-peer can then schedule the transmissions by allocating time slots and/or subcarriers of one or more channels that have been allocated for peer-to-peer communications, as discussed above.

In the illustrated example, the storage 615 includes spectrum allocation(s) 670. In some embodiments, the spectrum allocation(s) 670 generally indicate which portion(s) of the wireless spectrum have been allocated or reserved for peer-to-peer use (e.g., by a WLAN system, by one or more APs, by industry agreement, and the like). Although depicted as residing in storage 615, the spectrum allocations 670 may be stored in any suitable location, including memory 610.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

determining, by a first peer-to-peer device, one or more wireless channels allocated for peer-to-peer communication;

receiving, by the first peer-to-peer device, a first request indicating a first set of transmission characteristics from a second peer-to-peer device that uses the first peer-to-peer device as a communications proxy;

scheduling, by the first peer-to-peer device, wireless resources of the one or more wireless channels to a plurality of peer-to-peer devices based at least in part on the first set of transmission characteristics, wherein the first peer-to-peer device acts as a peer-to-peer coordinator for the plurality of peer-to-peer devices; and performing, by the first peer-to-peer device, peer-to-peer communications with the second peer-to-peer device in accordance with the scheduled wireless resources.

2. The method of claim 1, further comprising:

receiving, by the first peer-to-peer device, a second request indicating a second set of transmission characteristics from a third peer-to-peer device that uses the first peer-to-peer device as a communications proxy; and scheduling, by the first peer-to-peer device, the wireless resources of the one or more wireless channels to the plurality of peer-to-peer devices based further on the second set of transmission characteristics.

3. The method of claim 1, further comprising:

receiving, by the first peer-to-peer device, a second request indicating a second set of transmission characteristics from a third peer-to-peer device that acts as a communications proxy for a fourth peer-to-peer device; and scheduling, by the first peer-to-peer device, the wireless resources of the one or more wireless channels to the plurality of peer-to-peer devices based further on the second set of transmission characteristics.

4. The method of claim 1, wherein scheduling the wireless resources comprises assigning one or more communication time slots to each of the plurality of peer-to-peer devices based on respective priorities for each of the plurality of peer-to-peer devices.

5. The method of claim 1, further comprising:

receiving, by the first peer-to-peer device, one or more updated requests indicating one or more updated sets of transmission characteristics; and scheduling, by the first peer-to-peer device, wireless resources of the one or more wireless channels to the plurality of peer-to-peer devices based on the one or more updated set of transmission characteristics.

6. The method of claim 1, wherein:

the one or more wireless channels are allocated for peer-to-peer communication by a wireless access point (AP), and the wireless AP does not use the one or more wireless channels for wireless communications.

7. A non-transitory computer-readable medium containing computer program code that, when executed by operation of one or more computer processors, performs an operation comprising:

determining, by a first peer-to-peer device, one or more wireless channels allocated for peer-to-peer communication;

receiving, by the first peer-to-peer device, a first request indicating a first set of transmission characteristics from a second peer-to-peer device that uses the first peer-to-peer device as a communications proxy;

scheduling, by the first peer-to-peer device, wireless resources of the one or more wireless channels to a plurality of peer-to-peer devices based at least in part on the first set of transmission characteristics, comprising assigning one or more communication time slots to each of the plurality of peer-to-peer devices based on respective priorities for each of the plurality of peer-to-peer devices; and performing, by the first peer-to-peer device, peer-to-peer communications with the second peer-to-peer device in accordance with the scheduled wireless resources.

8. The non-transitory computer-readable medium of claim 7, the operation further comprising:

receiving, by the first peer-to-peer device, a second request indicating a second set of transmission characteristics from a third peer-to-peer device that uses the first peer-to-peer device as a communications proxy; and scheduling, by the first peer-to-peer device, the wireless resources of the one or more wireless channels to the plurality of peer-to-peer devices based further on the second set of transmission characteristics.

9. The non-transitory computer-readable medium of claim 7, the operation further comprising:

receiving, by the first peer-to-peer device, a second request indicating a second set of transmission characteristics from a third peer-to-peer device that acts as a communications proxy for a fourth peer-to-peer device; and scheduling, by the first peer-to-peer device, the wireless resources of the one or more wireless channels to the plurality of peer-to-peer devices based further on the second set of transmission characteristics.

10. The non-transitory computer-readable medium of claim 7, wherein the first peer-to-peer device acts as a peer-to-peer coordinator for the plurality of peer-to-peer devices.

11. The non-transitory computer-readable medium of claim 7, the operation further comprising:

receiving, by the first peer-to-peer device, one or more updated requests indicating one or more updated sets of transmission characteristics; and scheduling, by the first peer-to-peer device, wireless resources of the one or more wireless channels to the plurality of peer-to-peer devices based on the one or more updated set of transmission characteristics.

12. The non-transitory computer-readable medium of claim 7, wherein:

the one or more wireless channels are allocated for peer-to-peer communication by a wireless access point (AP), and the wireless AP does not use the one or more wireless channels for wireless communications.

13. A system, comprising:

one or more computer processors; and a memory containing a program which when executed by the one or more computer processors performs an operation, the operation comprising:

determining, by a first peer-to-peer device, one or more wireless channels allocated for peer-to-peer communication;

receiving, by the first peer-to-peer device, a first request indicating a first set of transmission characteristics from a second peer-to-peer device that uses the first peer-to-peer device as a communications proxy;

scheduling, by the first peer-to-peer device, wireless resources of the one or more wireless channels to a plurality of peer-to-peer devices based at least in part on the first set of transmission characteristics;

performing, by the first peer-to-peer device, peer-to-peer communications with the second peer-to-peer device in accordance with the scheduled wireless resources;

receiving, by the first peer-to-peer device, one or more updated requests indicating one or more updated sets of transmission characteristics; and scheduling, by the first peer-to-peer device, wireless resources of the one or more wireless channels to the plurality of peer-to-peer devices based on the one or more updated set of transmission characteristics.

14. The system of claim 13, the operation further comprising:

receiving, by the first peer-to-peer device, a second request indicating a second set of transmission characteristics from a third peer-to-peer device that uses the first peer-to-peer device as a communications proxy; and scheduling, by the first peer-to-peer device, the wireless resources of the one or more wireless channels to the plurality of peer-to-peer devices based further on the second set of transmission characteristics.

15. The system of claim 13, the operation further comprising:

receiving, by the first peer-to-peer device, a second request indicating a second set of transmission characteristics from a third peer-to-peer device that acts as a communications proxy for a fourth peer-to-peer device; and scheduling, by the first peer-to-peer device, the wireless resources of the one or more wireless channels to the plurality of peer-to-peer devices based further on the second set of transmission characteristics.

16. The system of claim 13, wherein scheduling the wireless resources comprises assigning one or more communication time slots to each of the plurality of peer-to-peer devices based on respective priorities for each of the plurality of peer-to-peer devices.

17. The system of claim 13, wherein:

the one or more wireless channels are allocated for peer-to-peer communication by a wireless access point (AP), and the wireless AP does not use the one or more wireless channels for wireless communications.

18. A method, comprising:

determining, by a first peer-to-peer device, one or more wireless channels allocated for peer-to-peer communication;

receiving, by the first peer-to-peer device, a first request indicating a first set of transmission characteristics from a second peer-to-peer device that uses the first peer-to-peer device as a communications proxy;

scheduling, by the first peer-to-peer device, wireless resources of the one or more wireless channels to a plurality of peer-to-peer devices based at least in part on the first set of transmission characteristics;

receiving, by the first peer-to-peer device, a second request indicating a second set of transmission characteristics from a third peer-to-peer device that acts as a communications proxy for a fourth peer-to-peer device;

scheduling, by the first peer-to-peer device, the wireless resources of the one or more wireless channels to the plurality of peer-to-peer devices based further on the second set of transmission characteristics; and performing, by the first peer-to-peer device, peer-to-peer communications with the second peer-to-peer device in accordance with the scheduled wireless resources.

* * * * *